Patented Mar. 2, 1937

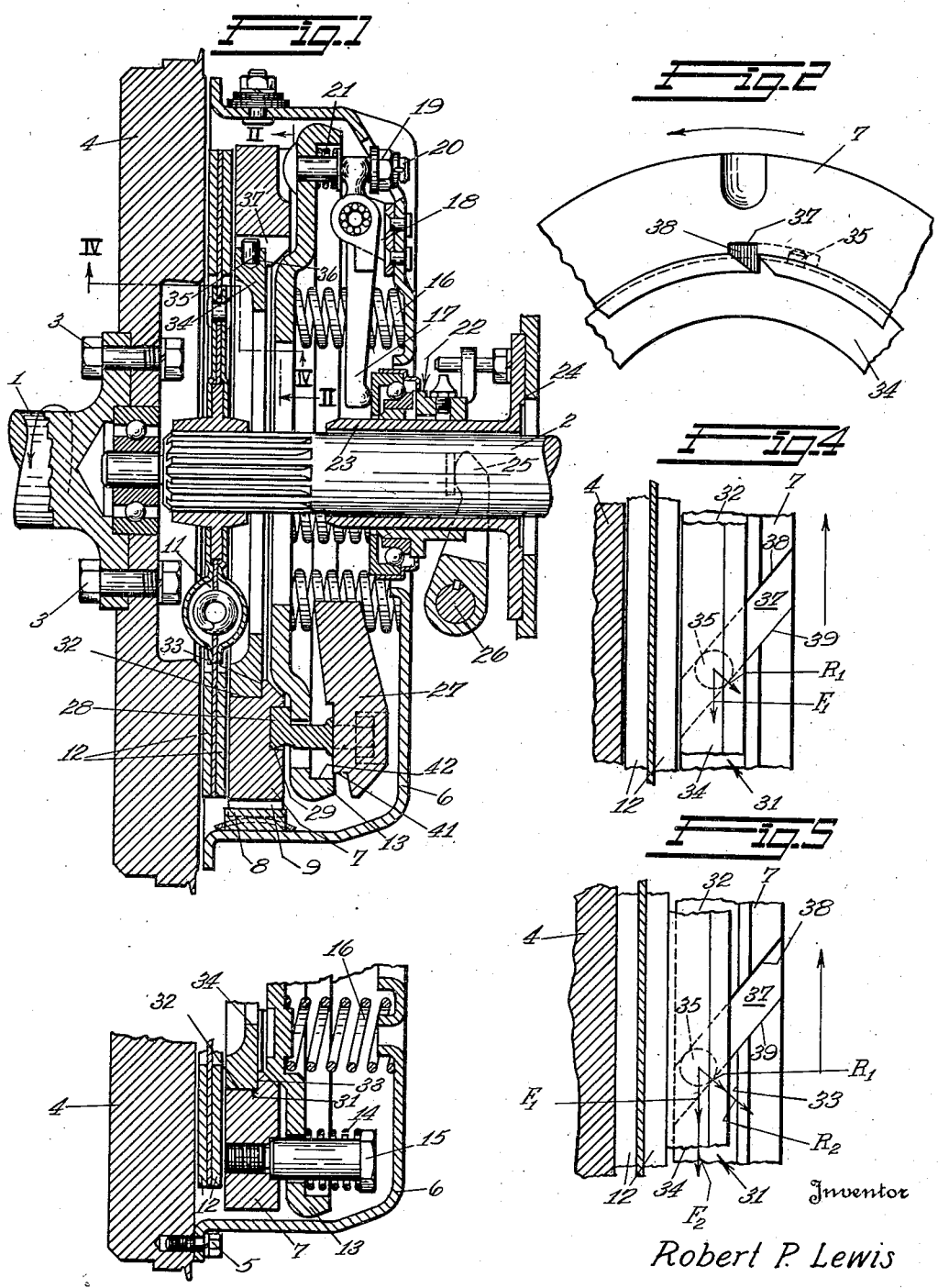

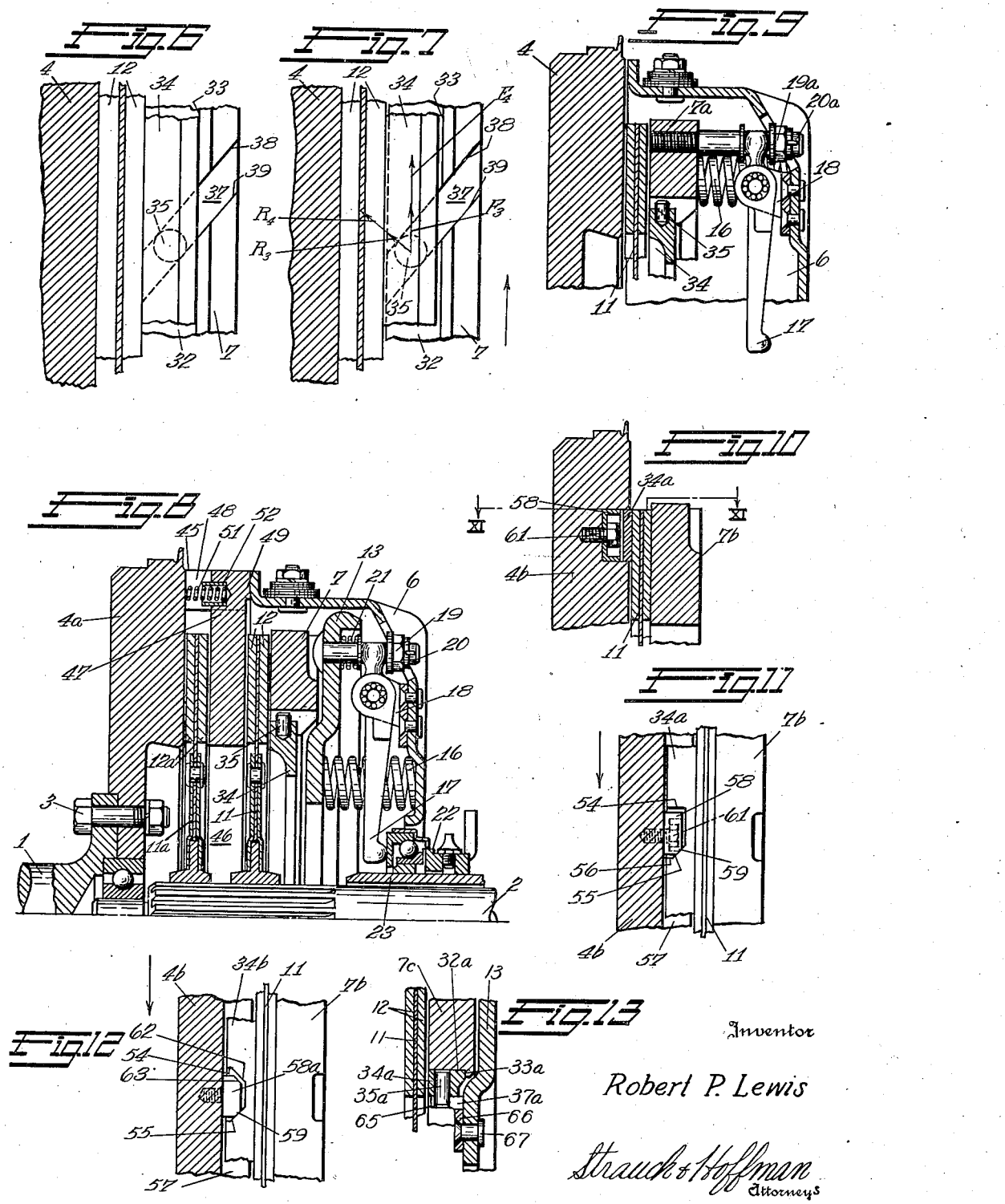

2,072,116

UNITED STATES PATENT OFFICE 2,072,116

CLUTCH MECHANISM

Robert P. Lewis, Toledo, Ohio, assignor to Spicer Manufacturing Corporation, Toledo, Ohio, a corporation of Virginia Application January 10, 1934, Serial No. 706,109

20 Claims. (Cl. 192—105)

The present invention relates to mechanisms for transmitting power from a driving member to a driven member. More particularly, the present invention relates to improved mechanisms for picking up loads without shock useful in manual clutches, and to automatic and self operating clutch and drive mechanisms.

In co-pending application Serial No. 676,567, filed June 19, 1933, an automatic clutch is disclosed which is operable to automatically establish a power transmitting connection between a driving shaft and a driven shaft when the driving shaft attains a predetermined or engaging speed. Mechanisms of this character have proven to be highly successful in practice in automotive or like drives as they have been found to smoothly establish a drive between the prime mover and the load when the prime mover is accelerated through a predetermined speed range. Clutches of this character have also been found in practice to have a useful life substantially greater than that of comparable manually operable clutches, despite the fact that they transmit power through a slipping drive during a large portion of their normal operation.

In certain commonly used automotive drives, through the nature of the transmission or free-wheeling or other driven units, universal joints and the like are employed therein, excessive lost-motion or back-lash exists between the driven clutch shaft and the vehicle wheels, with the result that if the engine or other prime mover is suddenly coupled to the driven clutch shaft the last motion or "back-lash" is almost instantaneously taken up and an objectionable noise commonly termed a "clunk" occurs, causing transmission of a sudden driving impulse or shock to the vehicle wheels. The magnitude of the "clunk" is influenced by the amount of lost motion present in the drive line, the degree of suddenness of clutch engagement, and the magnitude of the torque which is initially transmitted by the clutch.

It has been found that this shock and the "clunk" incident thereto can be reduced to some extent when using a manually operable clutch in the drive, by allowing the clutch to engage extremely slowly, so as to apply a very light initial torque to take up the lost motion before substantial driving torque is imposed upon the drive line by full clutch engagement. In practice, however, the average car driver is not sufficiently skilled to operate a manual clutch satisfactorily in this way. It has also been found that where automatic or speed responsive clutches are incorporated in such drives embodying substantial lost motion, particularly when the clutch clearances are not properly adjusted, it is only by exercising care to depress the accelerator slowly in its initial movement that the clutch can be operated to take up the back lash in the drive and to pick up the load without producing a "clunk". This operation requires more care than most drivers will exercise particularly as with a self operating clutch. The engine throttle may be opened wide and a smooth rapid pick up of the load is secured even though the back lash is suddenly taken up with a clunk that may be objectionable from a sales standpoint.

In automatic clutches of the type that are normally disengaged when the engine or other prime mover is operating at a predetermined idling speed, it has been proposed to minimize the objectionable effects of the operating feature just described, by adjusting the parts so that when the engine is operating at idling speed, the frictional plates or shoes are disposed in a very light engagement, with the result that a slight drag is present which tends to take up the lost motion or back-lash in the drive line. This remedy, while simple and effective, has been found to be impractical, since if the adjustment is carelessly made, so that the torque transmitted from the driving to the driven shaft, as the result of the drag, is too great, the driving and driven shafts will tend to rotate in unison with the result that excessive facing wear may be caused. When the facings undergo only minute dimensional changes as a result of wear during normal operation, the clutch no longer drags, with the result that the back-lash absorption is lost and the clutch must be re-adjusted to re-establish the requisite drag for proper operation. With a too close adjustment the facings may also expand due to heating in operation, thereby preventing the automatic functioning of the clutch due to imposition of too great a drag to permit proper release of the clutch when the engine is idling so that gears can be shifted and the vehicle will come to rest without a manual declutching operation.

The present invention aims to eliminate the above mentioned objectionable operating characteristics of manual and automatic clutches and to provide novel mechanisms that will take up lost motion in a drive line without shock and without resorting to any of the expedients that have been heretofore proposed.

It is accordingly a primary object of the present invention to devise a novel power transmitting mechanism which is particularly adapted for use and to eliminate shock in drive lines having substantial back-lash, although it is not limited in use to such drives.

It is a further major object of my invention to devise, for use in clutches of the character which are adapted to engage and establish a power transmitting connection between driving and driven shafts, novel means for causing the driving shaft to impress a torque of small magnitude upon the driven shaft prior to engagement of the clutch under certain predetermined operating conditions.

A further important object of my invention resides in the provision of automatic clutches of the character that are adapted to establish a power transmitting connection between driving and driven shafts when one of the shafts attains a predetermined speed, with means for automatically causing a torque of low magnitude to be transmitted between the shafts prior to engagement of the clutch when the driving shaft is suddenly accelerated.

My invention further provides an automatic clutch mechanism particularly adapted for use in drives having excessive back-lash, which will automatically establish a power transmitting connection between driving and driven parts of the drive when certain parts attain a predetermined speed, and yet that will not take the back-lash up so suddenly as to produce an objectionable shock in the drive, no matter how suddenly the parts are accelerated.

Another object of my invention is to devise a clutch mechanism which will automatically establish a low-torque drive between driving and driven shafts when one of the shafts is given a predetermined acceleration, and which is operable to establish a high-torque connection between the shafts when one of the shafts attains a predetermined speed.

It is a further object of the invention to devise, for use in an automatic clutch of the type which is operable to establish a drive between driving and driven shafts when one of the shafts atains a predetermined speed, and which is associated with a drive having substantial back-lash therein, means for automatically and quietly taking up the back-lash in the drive should the shafts be given an acceleration of such magnitude as to otherwise cause the clutch to suddenly take up the back-lash with an objectionable shock.

Another object of my invention is to provide clutch mechanisms having an acceleration responsive means with and without speed responsive means for establishing a power transmitting connection between driving and driven parts.

A further object of my invention is to provide friction clutches of the type adapted to establish a power transmitting connection between driving and driven members, with means that will transmit a torque of small magnitude between the members when the driving member is accelerated, and which will transmit a torque of greater magnitude between the members if the driving member tends to overrun with respect to the driven member when it is accelerated.

It is a further object of my invention to devise, for use in friction clutches, an acceleration responsive device for transmitting torque that is so designed as to manifest a self-energizing tendency when it is transmitting torque in one direction, and which will manifest a self-de-energizing tendency when it tends to transmit torque in the opposite direction.

It is a still further object of this invention to devise a mechanism for automatically transmitting torque between driving and driven shafts when one of the shafts is given a predetermined acceleration, and which may be rendered incapable of transmitting torque when the member is so accelerated.

A further object of the invention resides in devising a clutch having a power transmitting element that is adapted to be acted upon by an acceleration responsive mechanism and a speed-responsive mechanism, for transmitting torque of low and high magnitude respectively.

Another object of my invention resides in the provision of automatic clutches of the type that are adapted to establish a power transmitting drive between driving and driven members when one of the members attains a predetermined speed, with means for automatically causing a torque of low magnitude to be transmitted between the members when one of the members is suddenly accelerated or decelerated.

A further object of my invention is to devise an automatic clutch mechanism particularly adapted for use in drives having excessive back-lash, which will automatically establish a power transmitting connection between driving and driven parts of the drive when certain parts attain a predetermined speed, and yet that will not take up the back-lash so suddenly as to produce an objectionable shock in the drive, no matter how suddenly the parts are accelerated or decelerated.

It is another object of my invention to provide friction clutches of the type adapted to establish a power transmitting connection between driving and driven members, with means that will transmit a torque of small magnitude between the members when the driving member is accelerated or decelerated, and which will transmit a torque of greater magnitude between the members if the driving member tends to resist the accelerating or decelerating forces imparted to it by the driving member.

A further object of my invention is to devise a friction plate clutch device that will automatically establish a driving connection between driving and driven members when an acceleration of predetermined magnitude is imparted to one of them.

Another object of my invention is to devise, for use in clutches of the character having members mounted for engagement and disengagement; means for transmitting torque between the members when they are disengaged and one of them is given predetermined acceleration, and which is inoperative to so transmit torque under certain rotative conditions of the members.

Another object is to provide a clutch mechanism of the type having a frictional pressure plate, with an auxiliary pressure plate which is movably mounted with respect thereto, and is operable to transmit torque independently of, and concurrently with the pressure plate.

It is another object to devise a novel pressure plate for friction clutches, having an auxiliary power transmitting means adapted to transmit power independently of the pressure plate at times, and at other times transmit power as a part of the pressure plate.

Other objects of my invention will appear as the detailed description thereof proceeds in connection with the annexed drawings, and from the appended claims.

In the drawings,

Figure 1 is a longitudinal sectional view illustrating my invention as being embodied in an automatic, or speed responsive clutch.

Figure 2 is a view taken substantially on the line II—II of Figure 1, with parts broken away to more clearly illustrate the structure involved.

Figure 3 is a fragmental sectional view of the clutch shown in Figure 1 and illustrates one of the hold-back and driving spring assemblies utilized therein.

Figure 4 is a view taken on line IV-IV of Figure 1, looking in the direction of the arrows.

Figure 5 is a view similar to Figure 4, but illustrates the auxiliary plate disposed in the position it assumes when the flywheel is given an acceleration of predetermined magnitude.

Figure 6 is a view similar to Figure 4, but illustrates the automatic and auxiliary plates fully engaged with the driven member.

Figure 7 is a view similar to Figure 4, but it illustrates the relation of the parts when the clutch is undergoing either manual or automatic disengagement, with the driven shaft tending to overrun the driving shaft.

Figure 8 is a fragmental sectional view illustrating my invention incorporated in a double plate automatic clutch.

Figure 9 is a view similar to Figure 8 but illustrates a manually operable clutch equipped with my invention.

Figure 10 is a fragmental sectional view of a clutch having a modified form of my invention applied thereto, and Figure 11 is a detailed sectional view taken on the line XI—XI of Figure 10.

Figure 12 is a fragmental sectional view similar to Figure 11, but illustrating a further modification of my invention.

Figure 13 is a fragmental sectional view illustrating another form of my invention.

With continued reference to the drawings, wherein like reference characters designate like parts throughout the several views thereof, and with particular reference to Figures 1 to 7, inclusive, I have illustrated my invention as being incorporated in an automatic clutch, having a driving shaft 1 and a driven shaft 2, which are mounted for relative rotation.

Secured to a flange provided on driving shaft 1, by means of bolt assemblies 3 or the like, is a flywheel 4. Secured to flywheel 4, by means of cap screws 5 is a cover or housing member 6. A pressure plate 7, which will be hereinafter termed the automatic plate, is disposed within cover 6 and is mounted for synchronous rotation therewith by means of driving lugs 8 which are welded or otherwise suitably secured to cover 6 and extend into recesses 9 located in plate 7.

A driven member, designated generally at 11 and having facings 12 secured thereto in any well known manner, is splined to shaft 2 and is adapted to be frictionally gripped between plate 7 and the flywheel face. A reaction plate or member 13 is disposed adjacent plate 7 and the two are urged toward each other by means of holdback springs 14 which act against plate 13 and bear against the head of cap screw members 15, which extend through apertures in plate 13 and are threaded into plate 7. Plates 7 and 13 are normally urged toward the flywheel by means of a plurality of compression springs 16, which act against plate 13 and cover 6.

The automatic and reaction plate assembly is adapted to be moved away from the flywheel against the action of springs 16 by means of a plurality of levers 17 which are pivotally supported on brackets 18 carried by cover 6, and their outer ends are adapted to cooperate with nut and washer assemblies 19 which are carried by bolts 20. Bolts 20 are frictionally fitted into apertures in plate 13 and are encircled by anti-rattle assemblies 21 which tend to maintain lever 17 in contact with nut and washer assemblies 19 at all times.

The inner ends of lever 17 cooperate with a throwout assembly designated generally as 22 which is mounted for axial movement on a support 23 which is secured to clutch housing 24 in any well known manner (not shown). Axial movement of throwout assembly 22 is effected by means of a fork 25, which is secured to a throwout shaft 26.

Plate 7 is actuated by means of a plurality of centrifugally operable weight members designated generally at 27, which have lever portions extending through apertures in plate 13, and carry offset portions 28 which are normally clamped between plate 13 and the bottom of recesses located in plate 7 by springs 14 as seen in Figure 1 when the prime mover associated with the driving shaft is operating at or below idling speed. Weights 27 are adapted to rock outwardly about fulcrums 29 provided on portions 28 to thereby force plates 7 and 13 away from each other against the action of springs 14, and their operation will be amplified as the specification proceeds.

The clutch just described is more fully disclosed in copending application S. N. 676,567, filed June 19, 1933, and as its structural details form no part of the present invention, it will not be further described.

With shaft 26 disposed in the position illustrated in Figure 1, and with shaft 1 rotating at a speed which is below the operating speed of weights 27, the parts assume the position shown in Figure 1, with the plates disengaged and with shafts 1 and 2 disconnected.

When the engine is accelerated with shaft 26 disposed in the position just described, weights 27 rock outwardly about their fulcrums and bring the plates into engagement, and as the clutch action is automatic, or speed responsive under these conditions, this position of shaft 26 will be termed its automatic position.

Shaft 26 may be rocked in a counter clockwise direction from the position shown in Figure 1 into disengaging position. Rocking movement of shaft 26 in this manner, through levers 17, and bolts 20, causes reaction plate 13 to move to the right against the action of springs 16, and by reason of the connection established by the holdback assemblies, such movement of plate 13 disposes plate 7 in such a position that speed responsive actuation of weights 27 is ineffective to bring it into engagement with the driven member.

Shaft 26 may be allowed to rock to the other side of automatic position in a clockwise direction to allow springs 16 to force plate 7 into engagement with the driven member, and this will hereinafter be termed its engaging position.

Shaft 26 may be rocked into the various positions just described by any suitable mechanism. For instance, it may be releasably held in automatic position against the action of springs 16, by means of a latch mechanism of the character disclosed in copending application 688,018, filed September 2nd, 1933, or it may be controlled so as to introduce a power responsive phase into clutch operation by means of devices of the general character disclosed in copending application S. N. 669,766, filed May 6th, 1933, if desired. For the purposes of the present application shaft 26 may be considered as extending outwardly of housing 24 and carrying a clutch pedal thereon (not shown).

I preferably provide the clutch just described with means for imposing a torque of low magnitude upon shaft 2 when shaft 1 is suddenly accelerated, for the purpose of softly taking up any back-lash that may be present in the units driven by the clutch, and although it may take the form of any suitable mechanism and be directly associated with shafts 1 or 2, in the present embodiment of my invention it preferably takes the form of an auxiliary plate, which is adapted to transmit power from plate 7 to the driven member.

With particular reference to Figures 1, 2, and 4 of the drawings, plate 7 is provided with an annular groove designated generally at 31, which provides a cylindrical wall 32 and a flat face or seat 33. An auxiliary plate or ring 34, having a mass which is predetermined by the factors entering into the desired operating characteristics of the particular clutch, is disposed in groove 31 and is adapted to be journaled in wall 32 thereof. The adjacent frictional surfaces of plates 34 and 7 are preferably chamfered to avoid scoring of facing 12, and plate 34 is preferably so dimensioned, that when it is in firm contact with seat or face 33, its frictional surface will lie in substantially the same plane as the frictional surface of plate 7, so that plates 7 and 34 may, under such conditions, function as a unitary pressure plate.

Plate 34 may be actuated toward and away from the flywheel, in response to acceleration of shaft 1, by any suitable means, but in the present instance it takes the form of preferably three pins 35, which are frictionally fitted into recesses 36, located at preferably 120° intervals in plate 34. Pins 35 are received in grooves 37 formed in plate 7, and with reference to Figure 4 of the drawings, grooves 37 are preferably disposed at an angle of 30° with respect to the driving face of plate 7, although it is to be understood that this angle may be varied as desired, depending upon the mass or rotational inertia of plate 34, and the desired operating characteristics of the particular clutch involved.

Pins 35 are adapted to cooperate in driving engagement with walls or faces 38 and 39 of recesses 37. Walls 38 are adapted to engage pins 35 and produce disengaging or retracting movement of plate 34, and walls 39 are adapted to engage pins 35 and produce engaging or advancing movement of plate 34 in a manner that will be pointed out in more detail as the specification proceeds. With the parts rotating in the directions indicated by the arrows in Figures 1, 2, and 4, when shaft 1 is given an acceleration of predetermined magnitude, plate 34, by virtue of its inertia, tends to remain stationary with respect to plate 7, with the result that pins 35 thereof are forced into engagement with walls 39, and tend to advance or move plate 34 toward the flywheel and into the position illustrated in Figure 5. Conversely, when shaft 1 and plate 7 are suddenly decelerated, the angular or rotational momentum of plate 34 opposes the decelerating action, and pins 35 of plate 34 cooperate with walls 38 and tend to retract plate 34 and move it into the position illustrated in Figure 4. In this connection it should be understood that although I have disclosed an auxiliary plate that is adapted to undergo advancing movement when the driving shaft is accelerated, and is adapted to undergo retracting movement when the driving shaft is decelerated, it is to be understood, that if desired, walls 38 of slots 37 may be designed so as to lie parallel with the axis of the mechanism and the springs or other means relied upon to retract plate 34. Moreover, walls 38 may be oppositely inclined if desired, so as to cause plate 34 to undergo advancing or engaging movement both when the driving shaft is accelerated or decelerated, and the appended claims are intended to embrace an organization of this character.

In the present embodiment of my invention, I preferably so design and relate pins 35 and grooves 37, that the driving face of plate 34 will remain normal to the axis of the mechanism when it is undergoing advancing and retracting movement, but it is to be understood that if other than a normal plate action is desired in the particular clutch involved, the structure may be suitably modified, and the appended claims are intended to embrace my invention when the parts are related in this manner.

*Operation*

When the engine and driving shaft are given only a moderate acceleration, the automatic plate is automatically brought into engagement with the driven member when the driving shaft attains a predetermined speed, and during this operation the auxiliary plate remains inactive. On the other hand should the driving shaft be suddenly accelerated, the auxiliary plate initially comes into play and transmits a torque of low magnitude to the driven assembly, which picks up any back-lash therein, and when the parts attain a predetermined speed the automatic plate picks up the driven member. The automatic engaging operation, as it occurs when the driving shaft is only moderately accelerated, will now be described.

As shaft 1 and flywheel 4 are accelerated to a speed slightly in excess of idling speed, the parts remain in the disengaged position illustrated in Figure 1 by reason of the action of holdback springs 14 which act upon portions 28 of weights 27 and thereby maintain them in their inner or neutral position. When shaft 1 attains a higher speed, which is predetermined by the mass of weights 27 and the strength of springs 14, weights 27 rock outwardly about their fulcrums in response to centrifugal force. As this occurs, portions 28 of weights 27 act against plate 7 and react against plate 13 with the result that plate 7 is advanced toward the flywheel against the action of springs 14. While this operation is taking place plate 34 remains in contact with its seat 33, with the result that they simultaneously engage the driven member under the influence of weights 27.

After the driven member is thus frictionally gripped or clamped between automatic plate 7, auxiliary plate 34 and the flywheel, movement of plates 7 and 34 is substantially arrested and further rocking movement of weights 27, in response to further increasing centrifugal force, causes reaction plate 13 to be forced away from the flywheel against the action of spring 16. Movement of plate 13 in this manner causes pressure to slowly build up in springs 16 and a corresponding pressure is built up between plates 7 and 34 and the driven member.

A power transmitting connection is thereby automatically established between shafts 1 and 2, and the magnitude of the torque transmitted therebetween, upon initial engagement of plates 7 and 34 with the driven member, is of such low magnitude that any backlash that may be present in the driven assembly connected to shaft 2, such as a transmission or free wheeling unit, is quietly and softly taken up, with the result that when weights 27 rock outwardly, and cause substantial torque to be transmitted from shaft 1 to shaft 2, there is no slack in the drive line.

When shaft 1 attains a predetermined speed during the accelerating operation just described, weights 27 rock further outwardly and build up the plate pressure to such an extent as to establish a non-slipping drive between shafts 1 and 2. When a still higher predetermined speed is attained by shaft 1, weights 27 rock further outwardly and bring stop faces 41 provided thereon into contact with the inner circumferential wall of a flange 42 provided on reaction plate 13. When weights 27 are disposed in their outermost position in contact with their stops, further acceleration of shaft 1 is accordingly ineffective to cause further pressure to be built up between the plates. The plates are thereby held in driving engagement under a predetermined pressure, and a positive friction coupling exists between shafts 1 and 2.

On the other hand should shaft 1 be given a sudden acceleration, the engaging operation resulting therefrom occurs in the following manner. With the parts disposed in the position illustrated in Figures 1 and 4, and with automatic plate 7 rotating in the direction indicated in this figure, acceleration of plate 7, through slots 37 and pins 35, tends to accelerate plate 34 or increase the rotational momentum thereof. Plate 34, by reason of its inertia, tends to resist acceleration, and the magnitude of the forces set up therein and transmitted from pins 35 to plate 7, depend upon the rotational inertia of plate 34 and the magnitude of the acceleration imparted to plate 7. In the present instance the inertia forces set up in plate 34 are indicated in Figure 4 as $F_1$, and their components, which are applied to walls 39 of slots 37 are indicated at $R_1$. Application of these forces to inclined walls 39 causes plate 34 to move toward the flywheel into engagement with the driven member, and the parts then assume the position illustrated in Figure 5.

When plate 34 is brought into engagement with the driven member in the manner just described, and with shaft 2 rotating at a speed lower than that of shaft 1, a drag is immediately imposed upon plate 34 as the result of the rotation resisting action of the load associated with shaft 2. The dragging action sets up forces indicated at $F_2$ in Figure 5, having components $R_2$, which are applied to walls 39 of slots 37, which serve to augment forces $R_1$, and increase the pressure of engagement of plate 34 with the driven member, with the result that plate 34 undergoes a self-energizing action. Forces $R_2$ and $R_1$ are of low magnitude, but they are sufficient to force plate 34 into engagement with the driven member under a pressure that is sufficient to take up any back-lash in the driven assembly associated with shaft 2, and as this action preferably takes place before plate 7 is actuated, it is apparent that it is impossible to produce a clunk, no matter how suddenly shaft 1 is accelerated.

Acceleration of shaft 1 accordingly automatically establishes a light, or non-power transmitting connection between it and shaft 2, with the result that no matter how much play or backlash may be present in the units that are driven by shaft 2, it is smoothly taken up, so that when plate 7 is actuated and substantial power is transmitted from shaft 1 to shaft 2 no clunk or shock will occur.

When the driven member is gripped between the auxiliary plate 34 and the flywheel in the manner just described, and shaft 1 attains a speed corresponding to the operating speed of weights 27, they rock outwardly and force plate 7 into engagement with the driven member against the action of spring 14 in the manner previously described. When this operation takes place, auxiliary plate 34 remains in engagement with the driven member and pins 35 act against the walls 39 of groove 37 and when the operation is completed the parts assume the position illustrated in Figure 6, with plate 34 disposed in engagement with its seat 33 formed on plate 7. Plate 34 is accordingly "picked up" by the automatic plate, and further outward movement of weights 27 causes pressure to build up between plates 34 and the driven member at a rate proportional to that pressure built up between plate 7 and the driven member.

With the clutch mechanism just described installed in a conventional motor vehicle, and with the transmission in gear, and the clutch fully engaged in the manner just described, through either a moderate or sudden acceleration of shaft 1, and it is desired to stop the vehicle, the accelerator is released and the brakes are applied. When the vehicle, under the combined braking influence of the engine and the brake mechanism is decelerated to a predetermined speed, springs 14 overcome the centrifugal forces developed in weights 27 and force them inwardly to the position shown in Figure 1, and disengage plate 7 from the driven member. As the accelerator is released under these conditions, the engine tends to drop to idling speed, with the result that shaft 2 tends to overrun with respect to shaft 1. The relation of the parts, substantially at the instant of disengagement of automatic plate 7 from the driven member, is illustrated in Figure 7, and the overrunning action just described sets up forces indicated at $F_3$ in plate 34 whose components, indicated as $R_3$, are transmitted from pins 35 to walls 38 of groove 37, with the result that plate 34 moves away from the flywheel and out of engagement with the driven member.

The mechanism accordingly manifests self-disengaging or self-de-energizing characteristics, with the result that clutch disengagement is clean, and when disengagement occurs, there are no forces transmitted between shafts 1 and 2. When the clutch has automatically disengaged in the manner just described, the vehicle may be brought to a complete stop by continued application of the brake mechanism, or if it is desired, the accelerator may be depressed to produce acceleration of shaft 1 and automatic reengagement of the clutch in the manner previously described. Although the auxiliary plate tends to undergo a self-de-energizing or retracting movement whenever shaft 2 tends to overrun with respect to shaft 1, this action is only effective to actually disengage plate 34 from the driven member when automatic plate 7 has become disengaged from the driven member in the manner just described. Accordingly, when the accelerator is released and the clutch is fully engaged, the action of the centrifugal weights maintains plate 34 in contact with its seat 33, irrespective of any self-de-energizing or retracting forces that may be set up therein.

As has been previously explained, shaft 26 may be rocked in a counterclockwise direction to disengage the clutch, and in a motor vehicle it is frequently desirable when the free wheeling unit is locked out, to disengage the clutch in this manner for the purpose of shifting the transmission gears.

With the clutch fully engaged in the manner previously described, with weights 27 in their outer positions, if the accelerator is released, the clutch remains engaged until the driving and driven shafts decelerate to a speed where holdback springs 14 overcome the centrifugal forces set up in weights 27, and at this time springs 14 disengage the plates and rock weights 27 into their inner position. Assuming that the transmission is in gear and the accelerator is released when this operation is effected, driven member 11 continues to rotate as it is driven by the momentum of the vehicle transmitted through the final drive, the transmission and shaft 2, under the conditions just described, the backlash in the drive line is "taken up" with the respect to flow of power from the load to the engine, but if the engine is accelerated to again drive the load, the back-lash in the drive line must be again "taken up" in the manner previously described.

When the engine is accelerated, after the clutch has been disengaged in the manner just described, and the vehicle is coasting, auxiliary plate 34 silently takes up the back-lash in the rotating drive line parts, and the automatic plate is then actuated to pick up the vehicle in the manner previously set forth. The auxiliary plate is accordingly operable to take up the drive line back-lash whenever the driving shaft is accelerated, regardless of whether the driven shaft is rotating or stationary at the time. If the clutch is installed in a vehicle having freewheeling, it automatically disengages whenever the accelerator is released, as the engine may drop to idling speed, and when the engine is again accelerated to pick up the vehicle the auxiliary plate functions in the manner just described to silently take up the back-lash in the drive line. The auxiliary plate also functions in this manner when the engine is accelerated to pick up the moving vehicle after the clutch has been manually disengaged in the manner that will now be described.

With the clutch fully engaged in the manner previously described, counterclockwise rocking movement of shaft 26 moves plate 13, and plate 7, connected thereto by the holdback assemblies, to the right with the result that plate 7 is disengaged from the driven member. Assuming that the accelerator is released, driven shaft 2 tends to overrun driving shaft 1, and as soon as plate 7 has been disengaged from the driven member, de-energizing forces $R_3$ (Figure 7) applied by pins 35 to walls 38 of slots 37, promptly disengage auxiliary plate 34 from the driven member with the result that depression of the clutch pedal insures clean disengagement of the clutch.

If the magnitude of the deceleration of shaft 1, during the disengaging operation just described is sufficiently high, the angular momentum of plate 34, causes it to tend to resist the deceleration applied thereto by plate 7, and the forces set up therein are indicated in Figure 7 as $F_4$. The active components of forces $F_4$ are indicated as $R_4$, and they are applied to walls 38 of grooves 37, and as they augment forces $R_3$ they assist in disengaging plate 34 from the driven member.

After the declutching operation just described has been effected, the vehicle transmission may be readily shifted from a lower to a higher gear and the clutch pedal released to re-engage the plates.

If it is desired to shift the transmission from a higher to a lower gear, shaft 26 is rocked to disengage the clutch in the manner just described, and when the transmission has been placed in neutral, the accelerator is suddenly depressed, which results in driving shaft 1 undergoing a certain acceleration. The acceleration imparted to shaft 1 causes plate 34 to be engaged with the driven member in the manner previously described, with the result that shaft 2 and the transmission counter shaft are accelerated. The transmission may then be shifted into the lower selected gear quite readily without clashing in view of the fact that the accelerating operation has substantially synchronized the transmission parts.

It is apparent that the provision of clutches with my novel auxiliary plate organization not only eliminates any possibility of objectionable noisy shock or "clunk" from a back-lash take-up, but it also eliminates the necessity for going through a "double-clutching" operation when shifting the vehicle transmission from a higher to a lower gear. On the other hand, when the transmission is being shifted into a higher gear, the clutch disengagement is clean, with the result that the transmission parts may promptly decelerate and synchronize.

If it is desired to establish a driving connection between shafts 1 and 2 when shaft 1 is rotating below the operating speed of weights 27, shaft 26 may be rocked clockwise in the manner previously described, so as to allow springs 16 to force automatic plate 7 towards the flywheel and grip the driven member. When plate 7 undergoes movement in this manner, seat 33 formed thereon picks up auxiliary plate 34 and causes it to be likewise brought into engagement with the driven member. Spring 16 accordingly causes the driven member to be frictionally gripped by plates 7 and 34, and a driving connection is thereby established between shafts 1 and 2.

Although I have disclosed a particular form of mechanism for automatically advancing the auxiliary plate, and I prefer to use this structure by reason of its simplicity, it is to be understood that any other suitable mechanism may be employed for producing this result without departing from the spirit of my invention. For instance, the outer periphery of the auxiliary plate may be threadedly associated with surface 32 of plate 7 with a left-handed thread, or rollers cooperating with inclined planes may be employed to advance the auxiliary plate, and the appended claims are intended to embrace mechanisms of this character. Moreover, it is to be understood that while the present mechanism advances the auxiliary plate when the driving shaft is accelerated, and retracts it when the engine is decelerated, the pin and groove arrangement may be so designed as to effect advancing movement of the auxiliary plate upon deceleration as well as acceleration of the driving shaft if desired.

Movement of the auxiliary plate toward retracted position is definitely limited by cooperating seat 33 provided on plate 7, and although it is not deemed necessary to provide a stop for limiting advancing movement of the auxiliary plate, it is to be understood that such stop may be employed without departing from the spirit of the present invention.

Referring now to Figure 8 of the drawings, I have illustrated my invention as being applied to an automatic clutch of the double plate type, and its operation is substantially similar to that of the automatic clutch just described.

With continued reference to Figure 8, cover 6 is secured to an integrally formed rim portion 45 formed on flywheel 4a. An intermediate plate 46, having driving lugs 47 provided thereon, is disposed between driven member 11 and a similar driven member 11a. Driving lugs 47 are disposed in recesses 48 formed in rim 45 and are provided with boss portions 49 which are adapted to engage cover 6 for a purpose that will presently appear. A plurality of compression springs 51, associated with retaining bushings 52, are located in lugs 47 and bear against the face of the flywheel. When shaft 26 is disposed in automatic position, the parts appear as seen in Figure 8, with the plates disengaged and with springs 51 holding plate 46 with its boss portions 49 in contact with cover 6. The remaining parts of the mechanism are identical in structure and function to those employed in the device illustrated in Figures 1 to 7, inclusive, and therefore similar reference characters have been employed to designate them, and they will not be further described.

In this form of my invention, weights 27 rock outwardly and grip the driven member between plates 7 and 46 in the manner previously described in connection with the first modification of my invention upon moderate acceleration of shaft 1. Further rocking movement of plate 7 causes plate 46 to move away from cover 6 and toward the flywheel against the action of springs 51 and causes it to grip driven member 12a, between it and the flywheel. When driven members 11 and 11a have been gripped between their respective plates, further outward rocking movement of plate 27 causes pressure to be built up in springs 16 in the manner described in connection with the first form of my invention.

In the event that the shaft 26 is disposed in automatic position, and shaft 1 is suddenly accelerated, auxiliary plate 34 advances in the manner described in connection with the first form of my invention and grips driven member 11 between it and plate 46, thereby taking up any back-lash in the driven line. In this form of the invention, it is preferable that the engaging forces exerted upon plate 34 are of such magnitude that when it is actuated it does not cause plate 46 to move toward the flywheel against the action of springs 51, and clamp the second driven member between it and the flywheel, although if desired, these parts may be designed to produce this result. However, it has been found to be perfectly satisfactory in practice for the auxiliary plate to merely pick up one driven member in order to take the back-lash out of the driven line. It is to be understood, however, that in some installations if desired, a second auxiliary plate may be associated with plate 46 or the flywheel and designed to engage driven member 11a and the appended claims are intended to cover mechanisms of this character.

In Figure 9 I have shown the clutch illustrated in Figure 1 as being designed so as to operate as a manual clutch. In this form of the invention bolts 20a are provided with a reduced portion which is threaded into plate 7a, and springs 16 bear against cover 6 and act directly against plate 7a. In Figure 9 the clutch is shown as disengaged, and in the event that the clutch is installed in a motor vehicle and the transmission is in gear and the engine is accelerated suddenly, auxiliary plate 34 advances in the manner previously described and establishes a driving connection between shafts 1 and 2, thereby taking up any back-lash that may be present in the driven units. Although it is possible, in this form of clutch, to moderately accelerate the engine to a fairly high speed, and then suddenly release the clutch pedal and thereby produce a clunk, the normal tendency is to accelerate the engine fairly suddenly prior to engaging the clutch, with the result that plate 34 is actuated and the slack is taken out of the drive line prior to clutch engagement. Auxiliary plate 34 functions in a similar manner when the engine is suddenly accelerated with the clutch disengaged, for the purpose of speeding up the transmission parts prior to shifting it from a higher to a lower gear. When shifting the transmission from a lower to a higher gear, disengagement of the clutch, through moving plate 7a to the right, produces clean disengagement of auxiliary plate 34 providing the engine throttle is closed while the declutching operation is being effected.

In Figures 10 and 11, I have illustrated a further modified form of the invention wherein the auxiliary plate is located in the flywheel and cooperates with the outer region of the driven member.

With continued reference to Figures 10 and 11, an auxiliary plate 34a having an abutment face 54, an inclined or cam face 55, and a stop face 56, is mounted for limited oscillation in an annular groove 57 formed in flywheel 4B. Preferably three actuator members 58, having inclined faces 59, are secured within groove 57, by means of cap screws 61 or the like, and are adapted to advance auxiliary plate 34a when the flywheel is accelerated at a predetermined rate.

In Figures 10 and 11 auxiliary plate 34a is shown in its advanced position in engagement with driven member 11, and it has been moved into this position through acceleration of flywheel 4 and the resulting cooperation of faces 59 of plate 34a and faces 55 formed on members 58. The plate 7b is allowed to move toward the flywheel under the influence of springs 16, either through automatic operation as is the case in the clutch illustrated in Figure 1, or manual operation in the case of the clutch illustrated in Figure 9, plate 34a is forced back into recess 57 and it is so designed that when it contacts the bottom of groove 57, its frictional face lies in the plane of the driving face of the flywheel so that it becomes in effect a part thereof insofar as the power transmitting functions of the two are concerned.

With the parts disposed in the positions indicated in Figures 10 and 11, if the engine is decelerated, shaft 2 will overrun with respect to shaft 1, and as this action relieves faces 55 and 59 of pressure, driven member 7b is freed from driving influences. When this operation takes place, abutment face 54 of auxiliary plate 34a is brought into engagement with member 58, which limits further movement of the auxiliary plate. Although in this form of the invention auxiliary plate 34a does not manifest self-de-energizing tendencies when the engine driving shaft is accelerated, it is to be understood that by properly designing members 58, and providing additional cam or inclined faces thereon, this function can be accomplished thereby, and the device when so designed is also intended to be embraced by the appended claims.

Referring now to Figure 12, I have illustrated the device shown in Figures 10 and 11, slightly redesigned so as to produce actuation of auxiliary plate 34b when driving shaft 1 is accelerated or decelerated.

With continued reference to this figure, auxiliary plate 34b is provided with inclined faces 62, merging into abutment faces 54, which cooperate with inclined faces 63 formed on actuator members 58a.

In this form of the invention, which is particularly adapted though not necessarily limited for use in manually operable clutches, plate 34b may be caused to establish a light driving coupling between shafts 1 and 2 whenever shaft 1 is accelerated or decelerated.

With reference to Figure 13, I have illustrated a further modification of my invention which primarily differs from that illustrated in Figures 1 to 7 in the means employed for actuating the auxiliary plate. In this form of the invention the auxiliary plate is actuated by the reaction plate.

With continued reference to this figure, auxiliary plate 34c is adapted to cooperate with seat 33a formed on plate 7 in a manner similar to that described in connection with the previously described forms of my invention, and pins 35a project toward the axis of the mechanism and seat in slots 37a formed in the flange 65 of an actuating plate 66, which is secured to reaction plate 13 by means of a plurality of rivets 67. If desired, however, pins 35a may cooperate with slots formed in an integrally formed portion of plate 13.

Pins 35a cooperate with slots 37a so as to cause the auxiliary plate to advance and engage the driven member when the engine is accelerated, and are also preferably operable to effect retraction of the auxiliary plate when the engine is decelerated or when the automatic plate retracts when the driven member tends to overrun the driving member, but, if desired, slots 37a may be of V-shaped configuration so as to actuate the auxiliary plate when the engine is decelerated as well as when the engine is accelerated, as is effected by the device illustrated in Figure 12, and the appended claims are intended to embraces my novel mechanism when it is adapted to function in this manner.

In connection with all of the forms of my invention, it is observed that when the auxiliary plate has become engaged with the driven member as the result of acceleration of the driving shaft, the resulting drag causes the auxiliary plate to undergo a self-energizing action, and as the pins thereof react against the automatic or reaction plates, the total available reactive force is equal to the combined pressure of springs 16, and it is to be understood, that if in some instances, where such large reactive force should result in too great pressure being built up when the engine is frequently suddenly accelerated, means may be introduced into the device to definitely limit the magnitude of the reactive forces. For instance, the auxiliary plate actuating pin slots may be formed in a separate resiliently backed member, or cam faces may be formed on the auxiliary plate and be adapted to cooperate with spring pressed plungers utilizing independent springs or a portion of the forces of springs 16, and the appended claims are intended to embrace mechanisms of this character. Also, walls 39 of slots 37 may be replaced by leaf springs or the like, so as to limit the reactive forces to the strength of the springs if desired.

The term "automatic clutch" as employed in the specification and claims is intended to embrace clutches of the type employing vacuum or other power operated mechanism, with or without centrifugally responsive means, for effecting clutch engagement.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a power transmitting mechanism, a driving element; a driven element; speed responsive means for establishing a driving connection between said elements; and means operable to transmit power between said elements independently of the operation of said speed responsive means, and at speeds below the driving-connection-establishing speed of said speed responsive means, when one of said elements is given an acceleration of predetermined magnitude.

2. The mechanism specified in claim 1, wherein said last-named means is responsive to rotation of said driving element.

3. In power transmitting mechanism, a driving element; a driven element; driving and driven members mounted for engagement and disengagement and adapted to transmit power between said elements; means for causing said members to be brought into frictional engagement when one of them attains a predetermined speed; and means responsive to an acceleration of predetermined magnitude of one of said elements for transmitting power between said elements independently of the operation of said members, said last-named means being operable below said predetermined speed.

4. The mechanism described in claim 3, wherein said last mentioned means is adapted to transmit power directly between said members.

5. The mechanism specified in claim 3, wherein said last mentioned means is responsive to the acceleration of the driving element.

6. The mechanism described in claim 3, wherein said last mentioned means is responsive to the acceleration of the driving member and is adapted to transmit power from the driving to the driven member.

7. In a power transmitting mechanism, driving and driven members; a primary power transmitting device for selectively coupling said members; a secondary power transmitting device tend to automatically couple said members when one of them undergoes an acceleration of predetermined magnitude; and means, operable in response to uncoupling operation of said primary power transmitting device, for rendering said secondary device inoperative.

8. The mechanism described in claim 7, wherein said primary power transmitting device supports said secondary power transmitting device, and said devices are adapted to undergo unitary uncoupling movements.

9. In a clutch mechanism, a pressure plate adapted to frictionally cooperate with a driven member; an auxiliary plate operably associated with said pressure plate and adapted to undergo relative axial movement with respect thereto and frictionally cooperate with said driven member; and means for causing said auxiliary plate to move axially toward said driven plate when an acceleration of predetermined magnitude is imparted to said pressure plate, said pressure plate and said auxiliary plate being disposed on the same side of said driven member, and movable in the same axial direction when they undergo engaging movement.

10. The device described in claim 9, wherein said plates are adapted to frictionally engage a driven member, and said pressure plate is adapted to apply engaging forces to said auxiliary plate when it is engaged with the driven member.

11. In a clutch mechanism, a pressure plate and an auxiliary plate mounted for rotation and for axial movement; a driven member adapted to be engaged by said plates; means for moving said auxiliary plate into engagement with said driven member when said pressure plate is given an acceleration of predetermined magnitude, said means being operable to cause pressure to build up between said auxiliary plate and said driven member substantially in accordance with the magnitude of the torque transmitted from the auxiliary plate to the driven member.

12. The mechanism described in claim 11, wherein said means is operable to tend to disengage said auxiliary plate from said driven member when the driven member tends to overrun with respect to the auxiliary plate.

13. In a clutch, a pressure plate mounted for rotation and having a frictional surface disposed substantially normal to its axis of rotation; an auxiliary plate operably associated with said pressure plate and having a frictional surface disposed substantially in the plane of the frictional surface of said pressure plate under certain predetermined conditions, and means for causing said auxiliary plate to move axially of, and project beyond the frictional surface of said pressure plate when an acceleration of predetermined magnitude is imparted to said pressure plate.

14. The device described in claim 13, wherein said last-named means is also operable to actuate said auxiliary plate when a deceleration of predetermined magnitude is imparted to said pressure plate.

15. The device described in claim 13, wherein said means is operable to maintain said auxiliary plate in a plane parallel to the frictional surface of said pressure plate in all axial positions of said auxiliary plate.

16. In a clutch, a pressure plate mounted for rotation and operable to undergo axial movement toward and away from a driven member; an auxiliary plate mounted on said pressure plate and operable to engage said driven member independently of said pressure plate, means for causing said auxiliary plate to project beyond said pressure plate and engage said driven member when an acceleration of predetermined magnitude is imparted to said pressure plate; means for causing said pressure plate to engage said driven member; and means for causing said pressure plate to impart engaging movement to said auxiliary plate when it undergoes engaging movement.

17. The device described in claim 16, wherein said last-named means comprises an abutment provided on said pressure plate which is operable to engage behind said auxiliary plate when said pressure plate undergoes engaging movement.

18. In a power transmitting mechanism, driving and driven members mounted for relative rotation, a primary coupling device for coupling said members, a secondary coupling device operable to automatically move into a projected position with respect to said primary coupling device and coupling said members when an acceleration of predetermined magnitude is imparted to said driving member, said secondary coupling device being automatically movable out of projected position when said primary coupling device is operated to couple said members.

19. In a power transmitting mechanism, a driving member and a driven member mounted for relative rotation, a clutch embodying frictional elements for coupling said driving and driven members, means for establishing a power transmitting connection between said driving and driven members independently of the operation of said friction clutch when an acceleration of predetermined magnitude is imparted to said driving member, said last-named means being of comparatively low torque capacity and being self-operable to augment its power transmitting action when said driving means tends to operate at speeds in excess of that of said driven means.

20. In a power transmitting device, driving and driven means; friction clutch means for coupling said driving and driven means, a second friction clutch means automatically operable to establish a power transmitting connection between said driving and driven means when an acceleration of predetermined magnitude is imparted to one of said driving and driven means; and means for selectively rendering said second friction clutch means inoperative.

ROBERT P. LEWIS.